(12) United States Patent
Ueki et al.

(10) Patent No.: US 7,771,516 B2
(45) Date of Patent: Aug. 10, 2010

(54) METHOD OF REMOVING OZONE REMAINING IN WATER

(75) Inventors: Shuji Ueki, Tokyo (JP); Masahiro Saito, Tokyo (JP)

(73) Assignee: Mitsui Engineering & Shipbuilding Co., Ltd., Chuo-Ku, Tokyo (JP)

( * ) Notice: Subject to any disclaimer, the term of this patent is extended or adjusted under 35 U.S.C. 154(b) by 406 days.

(21) Appl. No.: 11/882,282

(22) Filed: Jul. 31, 2007

(65) Prior Publication Data

US 2009/0032473 A1 Feb. 5, 2009

(51) Int. Cl.
*B01D 19/00* (2006.01)
(52) U.S. Cl. .......................................... 95/260; 95/263
(58) Field of Classification Search .................. 95/263, 95/264, 265, 260
See application file for complete search history.

(56) References Cited

U.S. PATENT DOCUMENTS 6,125,778 A 10/2000 Rodden

FOREIGN PATENT DOCUMENTS

| JP | 03012283 A | * | 1/1991 |
| JP | 03186390 A | | 8/1991 |
| JP | 06142408 A | * | 5/1994 |
| JP | 2004-160437 | | 6/2004 |

OTHER PUBLICATIONS

"The New Convention: Ballast Water Convention Adopted," Global Ballast Water Management Programme, http://globallast.imo.org/mepc.htm <last accessed on Oct. 31, 2007>.

* cited by examiner

*Primary Examiner*—Duane Smith
*Assistant Examiner*—Douglas J Theisen
(74) *Attorney, Agent, or Firm*—Duane Morris LLP

(57) ABSTRACT

The present invention provides a method of removing ozone remaining in water by separating residual ozone which remains in water after ozone is mixed in the water and kills microorganisms in the water including the steps of storing water containing the residual ozone in a pressure tank, supplying the pressure tank with compressed air, generating coarse bubbles larger than the residual ozone existing in water in the form of micro bubbles in pressurized condition, making the residual ozone in the form of micro bubbles adhere to the coarse bubbles, separating the residual ozone from water as the coarse bubbles go up, and discharging the micro bubbles from the pressure tank.

Accordingly, the present invention provides a method of removing ozone remaining in water to remove ozone remaining in water inexpensively and efficiently.

9 Claims, 8 Drawing Sheets

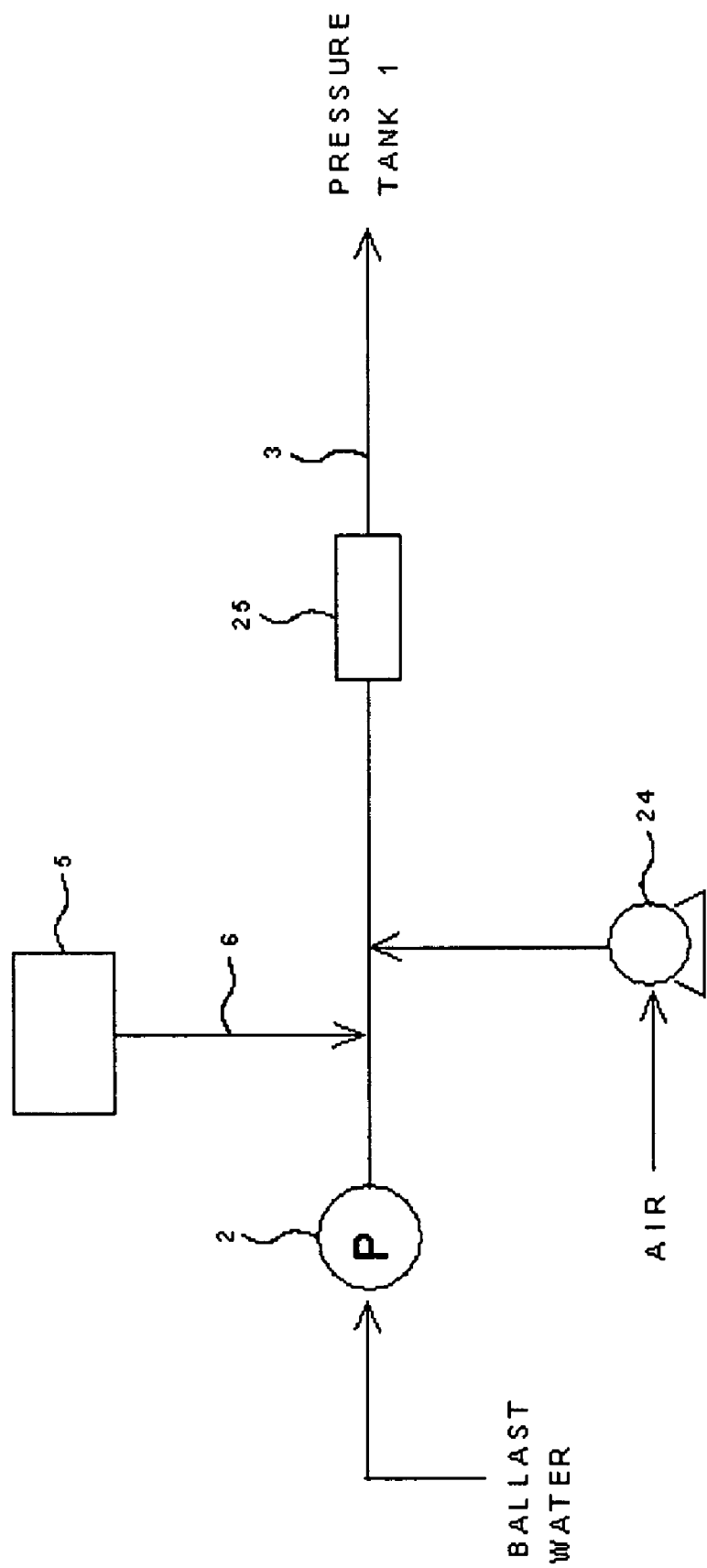

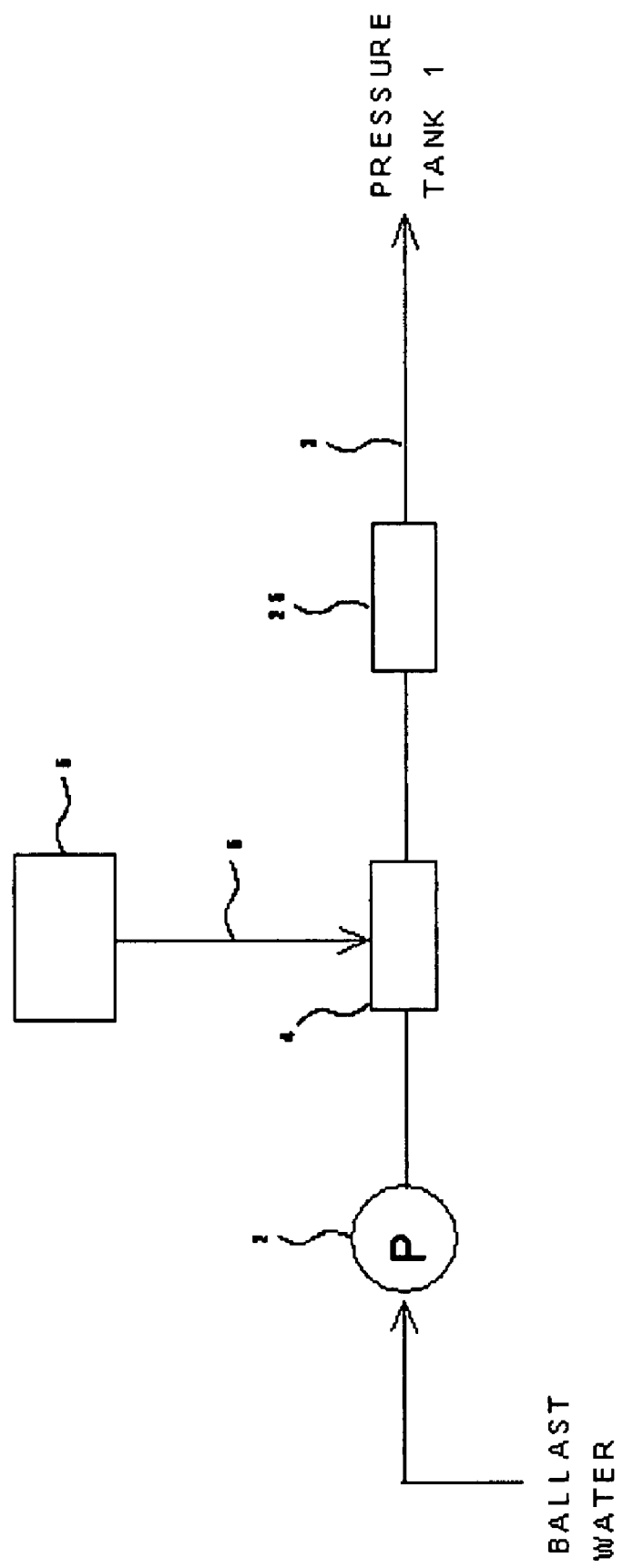

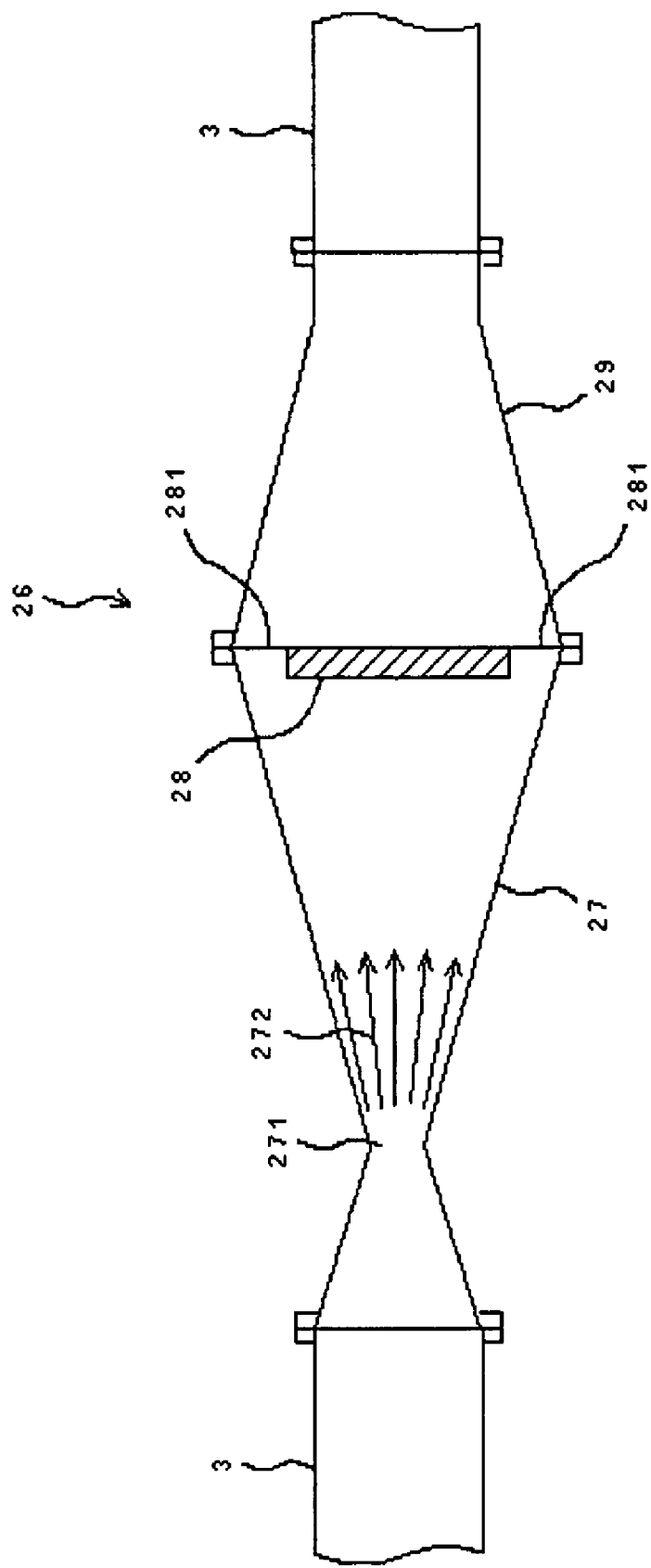

METHOD OF REMOVING OZONE REMAINING IN WATER

FIELD OF THE INVENTION

The present invention relates to a method of removing ozone remaining in water. More specifically, the present invention relates to a method of removing ozone which remains in the form of micro bubbles in water such as ballast water after killing microorganisms mixing in water with ozone, offering a solution to the problem of corrosion of ballast tanks by ozone.

BACKGROUND

Cargo ships carrying crude oil, etc are provided with ballast tanks to balance their body during navigation.

Usually, the ballast tanks are filled with ballast water when crude oil, etc are not on-board, while the ballast water is discharged before crude oil, etc are loaded.

Ballast water is necessary for safe navigation of ships, and it is usually taken from sea water in the port where cargo handling is undertaken. The total quantity of ballast water used in the world is estimated at 3 to 4 billion tons a year.

Ballast water contains aquatic organisms which inhabit in ports where the ballast water is drawn, and the aquatic organisms are conveyed to other countries as the ships move. Consequently, destruction of ecological system is increasingly serious that alien organism species take the place of indigenous species in the sea area.

As seriously considered the above background, a diplomatic conference at the International Maritime Organization (IMO) adopted the International Convention for the Control and Management of Ships' Ballast Water and Sediments to make the obligation of implementing ballast water control by use of any ballast water treatment apparatus be applied to ships to be built from 2009 onward.

In addition, the convention prescribed the ballast water discharging standard as shown in Table 1:

TABLE 1

| | Items | Ballast Water Quality Criteria | Size |
|---|---|---|---|
| | Aquatic Organisms | 10 unit/ml | 10-50 μm |
| | Aquatic Organisms | 10 unit/m³ | 50 μm or more |
| Indicator Microbes | *Escherichia Coli* | 250 cfu/100 ml | / |
| | *Vibrio cholerae* (O1 and O139) | 1 cfu/100 ml | / |
| | Genus *Enterococcus* | 100 cfu/100 ml | / |

Accordingly, it is now a matter of great urgency to develop a sterilization and/or elimination technology in the ballast water which can solve the above problem.

Conventionally, a technology for sterilization by means of injecting ozone into ballast water in parallel with injecting steam and further generating micro bubbles of ozone to promote formation of hydoxyradicals to reduce consumption of ozone has been offered, as seen in Unexamined Patent Application Publication No. 2004-160437(JP).

SUMMARY

Ozone is mixed into ballast water to perform sterilization, as a result, ozone left unused for sterilization remains in the form of micro bubbles. When water containing this residual ozone is poured into a ballast tank, the residual ozone causes a problem of corroding the ballast tank, transfer piping, etc.

In case of building a new ship it may be considered to use corrosion-resistant materials for ballast tanks, transfer piping, etc to solve this problem; however, it will cause a problem of increasing shipbuilding costs remarkably. In case of an existing ship it may be considered to apply corrosion-resistant paint or corrosion-resistant rubber lining, etc.; however it will also cause a problem of higher costs.

On the other hand, if the water containing residual ozone is left alone at atmospheric pressure for dozens of minutes, the residual ozone will separate from the water and escape into the air. However, in order to do so, it will be necessary to have a tank of large volume sufficient for leaving the water containing residual ozone alone before pouring it into a ballast tank. It will be very costly and impractical.

Furthermore, it may be considered to hold the water containing the residual ozone in a tank for a time to accelerate deaeration of the residual ozone by reducing the pressure in the tank to remove the residual ozone; however, it will require a transfer pump as well as a pressure-reducing pump, causing a problem of higher costs.

It is to be noted that holding ozonized water will cause a problem of corrosion by residual ozone; therefore, the problem is not peculiar to ballast water, but common to any usual water.

The object of the present invention is to provide a method of removing ozone remaining in water to remove ozone remaining in water inexpensively and efficiently.

Other objects of the present invention will be disclosed in the following description.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein:

FIG. 6 shows an example of device to reduce the quantity of ozone to be mixed into ballast water;

FIG. 7 shows another example of device to reduce the quantity of ozone to be mixed into ballast water; and FIG. 8 shows an example of a jet generating device.

DETAILED DESCRIPTION

Figure 1:
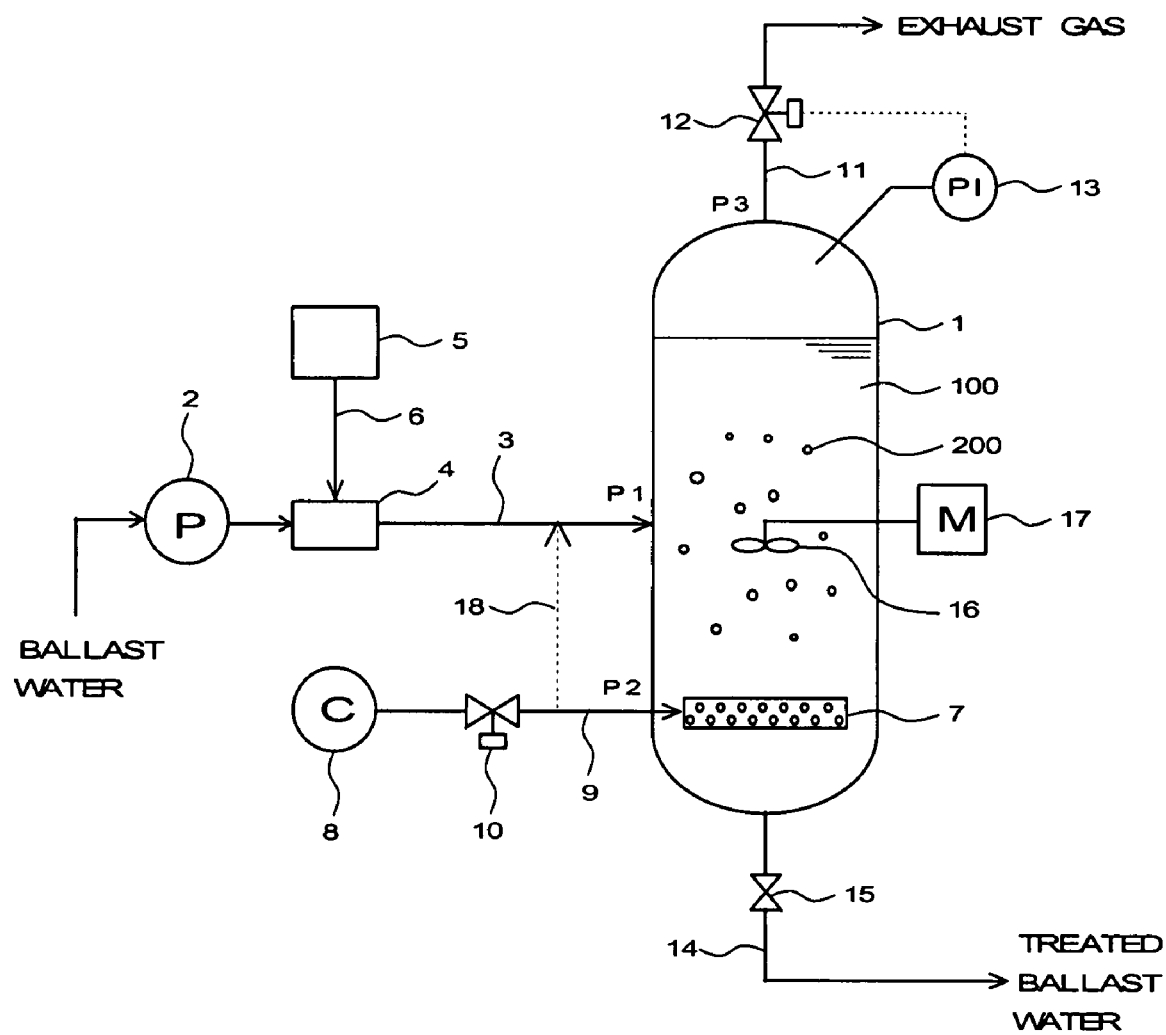
FIG. 1 shows an example of an apparatus for implementing the method of removing ozone remaining in ballast water embodying the present invention.

A pressure tank 1 in FIG. 1 stores ballast water 100 sterilized with ozone.

The ballast water 100 is water picked to be poured into a ballast tank (not shown) of a ship such as a tanker.

Sea water is usually used as the ballast water 100. In order to pour the ballast water 100 into the ballast tank, sea water is sucked with a pump 2 and sent to the pressure tank 1 through a pipe 3.

A filter (not shown) may be installed between the pressure tank 1 and the pump 2 to remove litter and trash.

The ballast water 100 sucked with the pump 2 is mixed with ozone injected in the process of its transfer to the pressure tank 1 through the pipe 3. The injected ozone is mixed into the ballast water and kills microorganisms (e.g. aquatic organisms, colon bacillus, etc. as shown in Table 1).

There is no specific limitation placed on methods of mixing ozone into the ballast water 100.

FIG. 1 shows an embodiment of mixing ozone into the ballast water 100 by use of a static mixer 4 capable of mixing gas and liquid.

The static mixer 4 is supplied with the ballast water 100 and ozone. Ozone is fed from an ozonizer 5 through an ozone injection tube 6. The ballast water 100 and ozone are mixed each other in the static mixer 4, and ozone is instantly mixed with the ballast water. As a result, microorganisms in the ballast water 100 are killed by ozone in a few seconds.

The static mixer 4 is preferably such a mixer as is small in pressure loss and excellent in mixing efficiency.

An aeration pipe 7 is equipped with at the lower part of the pressure tank 1. The aeration pipe 7 is connected to a compressor 8, which is an example of compressed air supply means through a pipe 9. The pipe 9 has a regulating valve 10 which controls the air pressure from the compressor 8. Driving the compressor 8, compressed air controlled a predetermined pressure is supplied to the aeration pipe 7.

Numeral 11 is an exhaust pipe 11, providing at the upper part of the pressure tank 1, which discharges exhaust gas containing the residual ozone separated from the ballast water 100. The exhaust pipe 11 has a pressure-regulating valve 12 that controls the inner pressure of the pressure tank 1.

Numeral 13 is a pressure sensor that senses the inner pressure of the pressure tank 1, and transmits signals to control the opening and closing of the pressure-regulating valve 12 to regulate the inner pressure of the pressure tank 1 at a predetermined pressure.

Numeral 14 is a transfer pipe, providing at the lower part of the pressure tank 1, which transfers the ballast water 100 rid of the residual ozone to the ballast tank (not shown). The transfer pipe 14 is equipped with an on-off valve 15.

The pressure tank 1 can be equipped inside with an agitator 16, if necessary. The agitator 16 is driven by a motor 17.

A method of removing residual ozone from the ballast water 100 in the pressure tank 1 is then described as follows:

The inner pressure of the pressure tank 1 is maintained at a certain level by the pressure of the pump 2 through regulation by the pressure-regulating valve 12.

Figure 2:
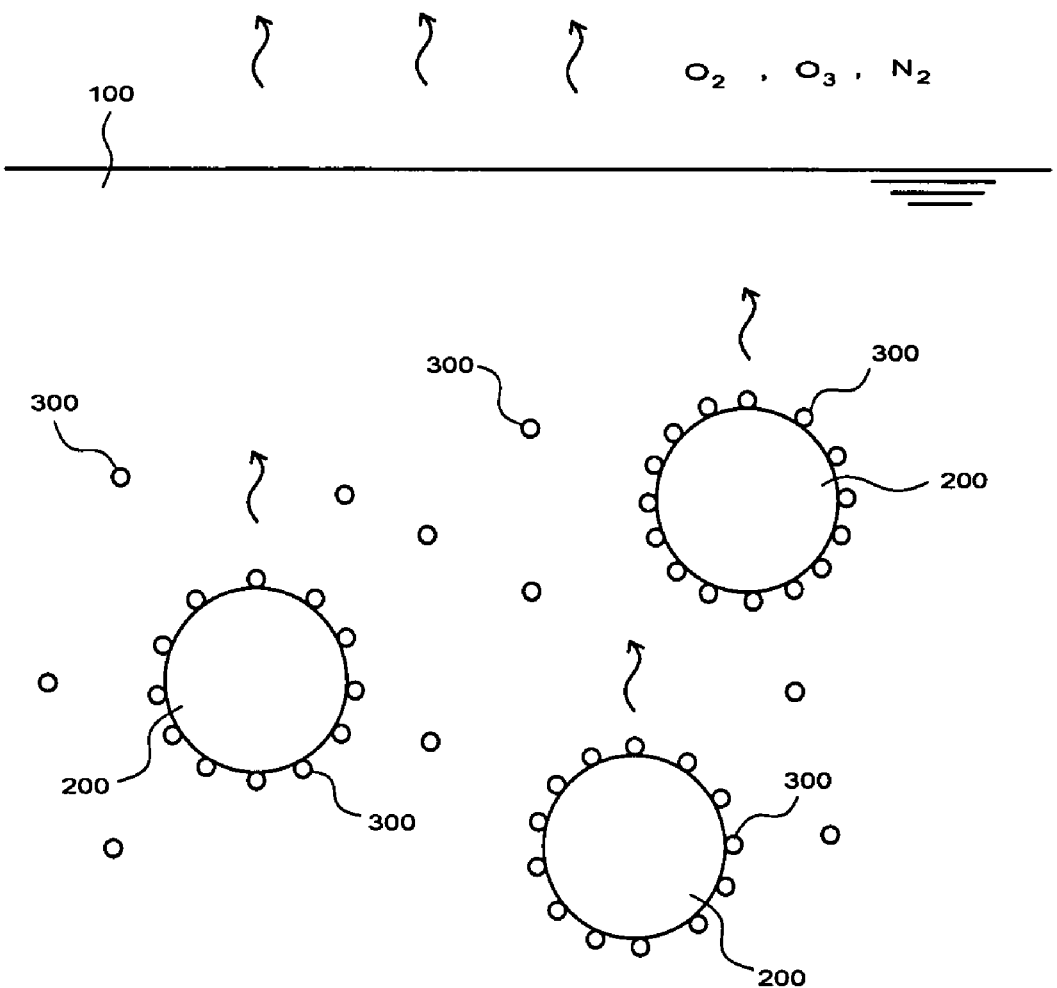
FIG. 2 is an illustration of how micro bubbles of ozone are separated and removed.

The ballast water 100 in the pressure tank 1 contains the residual ozone not used for sterilization in the form of micro bubbles 300, as shown in FIG. 2. It is because ozone is injected into the ballast water 100 excessively since it is not realistic to inject ozone in the quantity corresponding to the quantity of microorganisms in water subject to treatment at the ratio of 1:1 to meet the regulatory standards perfectly.

Most of the ozone mixed in the ballast water 100 is used to kill microorganisms and does not corrode ballast tanks, etc. However, surplus ozone is not used for sterilization and is left in the ballast water 100 in the size of micro bubbles 300 that is 0.5 µm to 500 µm. The ozone remaining in the form of these micro bubbles 300 causes the problem of corroding ballast tanks, etc.

In experiments conducted by the present inventors, if the inner pressure of the pressure tank 1 is, for example, about 0.3 MPa (3 kgf/cm$^2$), the ozone remaining in the ballast water 100 takes a form of micro bubbles 300 of about 50 µm.

While the higher the inner pressure of the pressure tank 1 is, the finer the micro bubbles 300 become, the size of the micro bubbles 300 does not become larger than about 50 µm if the inner pressure of the pressure tank 1 is maintained at the level as abovementioned.

High-pressure air is sent by means of the drive of a compressor 8 through the pipe 9 to the aeration pipe 7 in which ozone remains in the form of micro bubbles 300 in pressurized condition. This generates coarse bubbles 200 larger than the micro bubbles 300 contained in the ballast water 100 from the aeration pipe 7. These coarse bubbles 200 go up through the ballast water 100 because of high buoyancy.

Since the inside of the pressure tank 1 is kept in pressurized condition, the micro bubbles 300 in the ballast water 100 adhere to the sphere of the coarse bubbles 200 as the coarse bubbles 200 go up through the ballast water 100 as shown in FIG. 2.

That is to say, the present invention ensures that the coarse bubbles 200 larger than the micro bubbles 300 contained in the ballast water 100 are generated in the pressure tank 1 under pressurized condition and the micro bubbles 300 adhere to the coarse bubbles 200 and separate from the ballast water 100.

The size (diameter) of the coarse bubbles 200 is preferably 10 to 100 times as large as that of the micro bubbles 300 in the ballast water 100. If, for example, the size of the micro bubbles 300 is about 50 µm as abovementioned, the size of the coarse bubbles 200 is preferably 500 µm to 5 mm.

The size of the coarse bubbles 200 can be adjusted by adjusting the pressure of the compressor 8 or the construction of the aeration pipe 7.

If the pressure sensor 13 detects the inner pressure of the pressure tank 1 having reached a predetermined pressure, it transmits a signal to open the pressure-regulating valve 12. This signal regulates the travel of the pressure-regulating valve 12. In this way, the exhaust gas ($O_2$, $O_3$, $N_2$) containing the residual ozone separated from the ballast water 100 by the coarse bubbles 200 is discharged outside through the exhaust pipe 11. The pressure tank 1 is preferably supplied at this point with compressed air so that the exhaust gas can be discharged more easily.

The following is a preferable example of conditions for pressurizing the pressure tank 1:

Let P1 be the pressure at the inlet of the water from the pipe 3 connected the pressure tank 1, P2 be the pressure at the inlet of the air from the pipe 9 and P3 be the set pressure of the pressure-regulating valve 12. P1 is 0.02-0.7 MPa (0.2-7 kgf/cm$^2$), P2 is 0.01-0.7 MPa (0.1-7 kgf/cm$^2$) and P3 is 0.01-0.6 MPa (0.1-6 kgf/cm$^2$). P1 and P2 are preferably identical each other in substance or P2 is preferably set to be 0.01-0.2 MPa (0.1-2 kgf/cm$^2$) higher than P1. P3 is preferably set to be identical to or lower than P1 or P2.

More specifically, if P1 is set at about 0.3 MPa (3 kgf/cm$^2$), P2 is set at about 0.4 MPa (4 kgf/cm$^2$) and P3 is set at about 0.3 MPa (3 kgf/cm$^2$), the pressure tank 1 is pressurized at the pressure of P2. As P2 is set higher than the set pressure of P3, the pressure-regulating valve 12 opens under the control of the pressure sensor 13, and exhaust gas containing residual ozone is discharged through the exhaust pipe 11. On-off control of opening and closing of the pressure-regulating valve 12 makes it possible to discharge exhaust gas from the exhaust pipe 11 continuously.

While high-pressure air is sent to the aeration pipe 7, the ballast water 100 is preferably agitated moderately by rotating the agitator 16 to accelerate contact of the coarse bubbles 200 with the micro bubbles 300 in the ballast water 100.

The high-pressure air from the compressor 8 may also be sent to the pressure tank 1 from the pipe 3 in whole or in part through the pipe 18.

In the present invention, ozone remaining in the pressure tank 1 can be removed continuously. Since the pressure tank 1 is in pressurized condition, no other pump is required to transfer the ballast water 100 rid of the residual ozone to the ballast tank (not shown).

In the present invention, the time required for removing the residual ozone is extremely short since high-pressure air is sent from the aeration pipe 7 in pressurized condition. In the present invention, the residual ozone is removed in 1 to 5 minutes of processing. Therefore, the required retention time of the ballast water 100 in the pressure tank is within the range of only 1 to 5 minutes.

Measures is preferably taken to prevent shortcutting of the ballast water 100 yet to be rid of residual ozone in the pressure tank 1 in order to allow continuous removal of residual ozone in the pressure tank 1 and continuous transfer of the ballast water 100 rid of residual ozone to the ballast tank.

Figure 3:
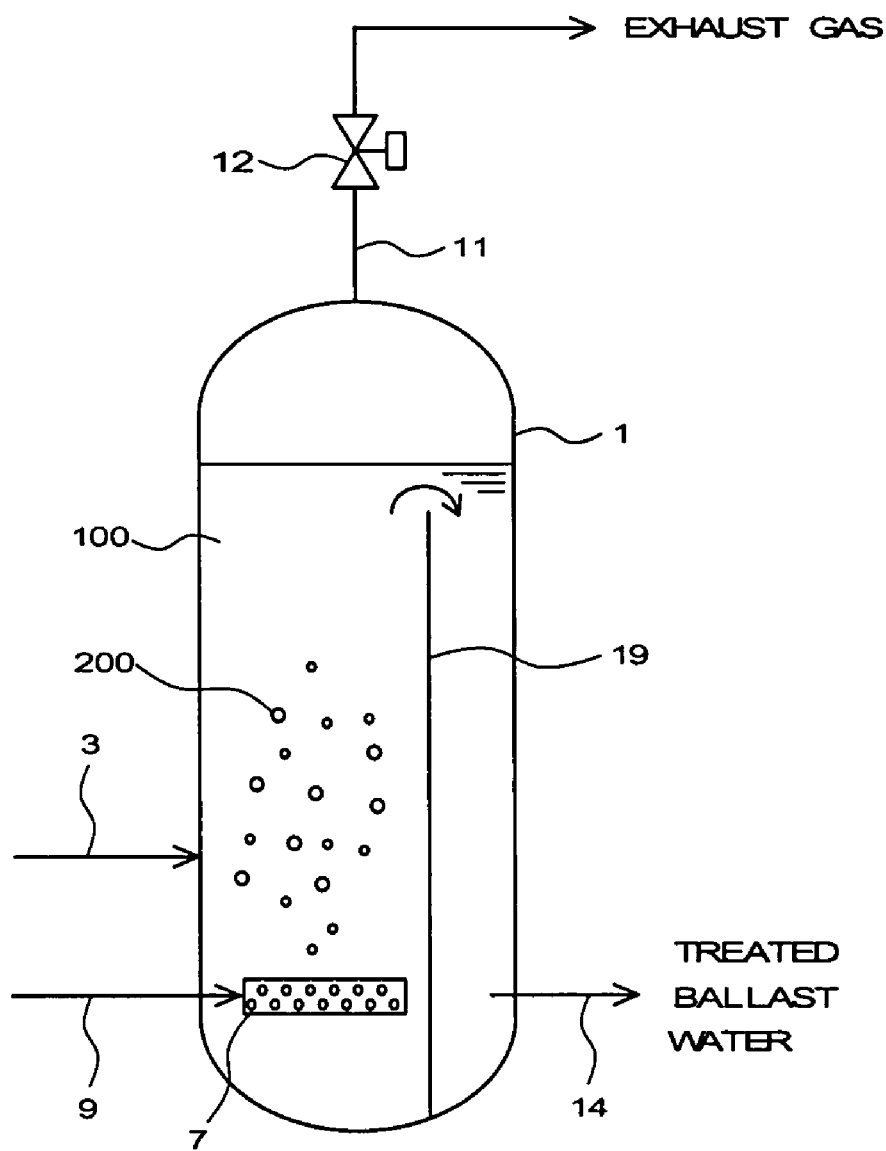
FIG. 3 shows an example of another apparatus for implementing the method of removing ozone remaining in water embodying the present invention.

A device of preventing the shortcutting can be constituted by a partition plate 19 which stands from the bottom of the pressure tank 1, as shown in FIG. 3. The inside of the pressure tank 1 is divided into two chambers. The two chambers join each other above the partition plate 19. The ballast water 100 is rid of residual ozone by the high-pressure air sent from the aeration pipe 7 in the one chamber, then transferred to the other chamber over the partition plate 19. The transfer pipe 14 transfers the ballast water 100 rid of the residual ozone in the latter chamber to the ballast tank.

Furthermore, in the present invention, it is possible to adopt a discrete treatment (batch-type treatment), if necessary.

Figure 4:
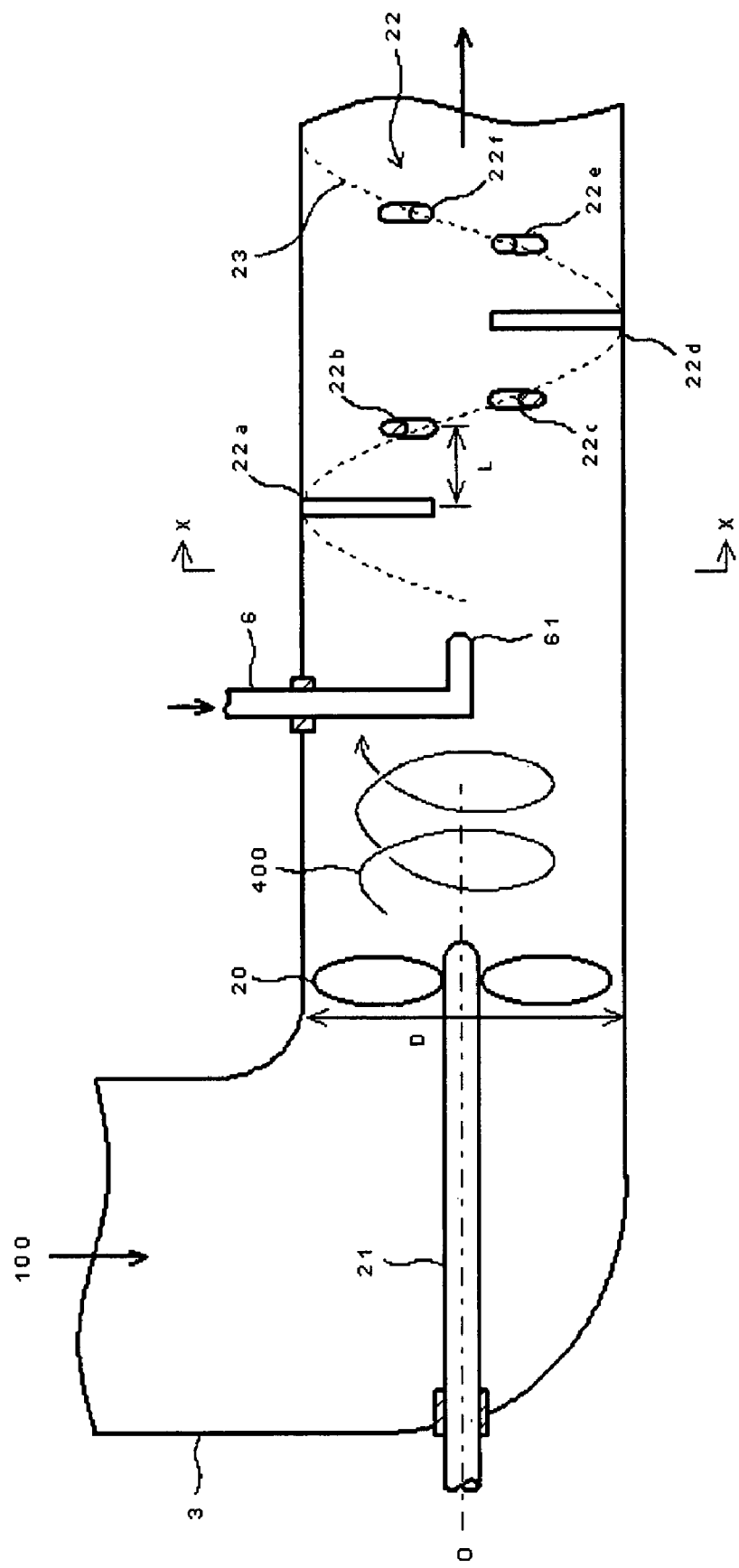
FIG. 4 shows an example of an apparatus for mixing ozone in ballast water.
Figure 5:
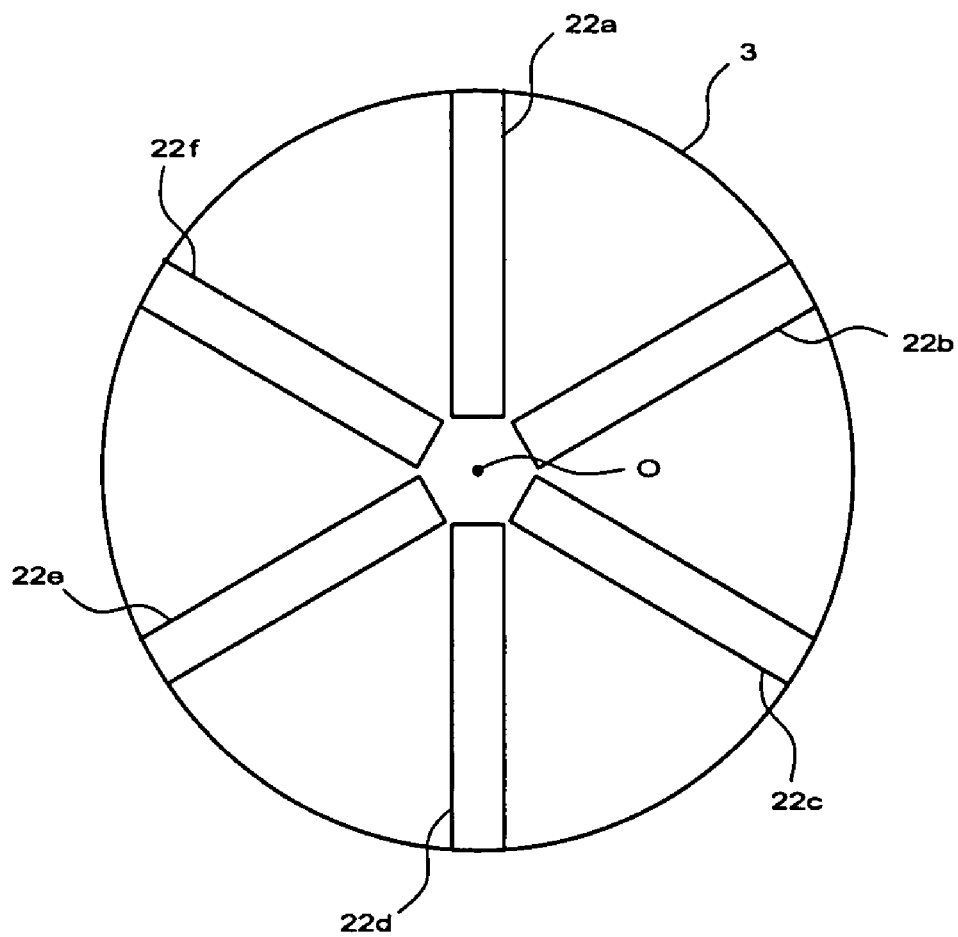
FIG. 5 is a cross-sectional view along line X-X in FIG. 4.

Then, another embodiment for mixing ozone in the ballast water 100 in the pipe 3 is described as follows:

FIG. 4 shows an apparatus which mixes ozone into ballast water and FIG. 5 is a cross-sectional view along line X-X in FIG. 4.

In this embodiment, the tip of the ozone injection tube 6 is inserted into the pipe 3. The ozone injection tube 6 jets ozone into the ballast water 100 in the pipe 3 from a nozzle 61 mounted on an U-shaped tip.

A screw-propeller 20 is installed on the upstream side of the ozone injection tube 6 in the pipe 3 for generating whirlpools. The screw-propeller 20 rotates at high rates of 3000-6000 rpm, for example, to generate high-speed whirlpools 400 in the ballast water 100 flowing in the pipe 3.

The drive shaft 21 of the screw-propeller 20 passes through the pipe wall of the pipe 3 which bends in the shape of L. The drive shaft 21 rotates by means of a motor or an engine (not shown).

A turbulent flow generating device is installed on the downstream side of the ozone injection tube 6 in the pipe 3. This turbulent flow generating device can be represented by the static mixer, etc. An example of it is shown in FIG. 5. The turbulent flow generating device is constituted by a plurality of plates (six plates are shown in FIG. 5) or rod-shaped bodies 22 (22a, 22b, 22c, 22d, 22e and 22f) which are arranged spaced at predetermined intervals on an imaginary spiral line 23 drawn on the inner surface of the pipe 3.

The space L in the direction of the shaft line O of two plates or rod-shaped bodies 22 adjoining each other is related to the inside diameter D of the pipe 3 or the velocity of the ballast water 100, etc. and is preferably within the range of 10-50 mm and more preferably 20-30 mm. The space L being beyond the said range, the turbulent flow will not occur easily.

The plates or rod-shaped bodies 22 are slightly shorter than the radius of the pipe 3 and stand upright toward the shaft line O of the pipe 3 on the inside wall surface of the pipe 3.

The plates or rod-shaped bodies 22 are formed to have an oval cross section. The plates or rod-shaped bodies 22 are so mounted on the inside wall surface of the pipe 3 that the direction of the long axis of the oval may face to the circumference of the pipe 3. The oval cross section of the plates or rod-shaped bodies 22 promotes shearing whirlpools 400 which rotate spirally.

Ozone jetted out from the nozzle 61 of the ozone injection tube 6 forms small bubbles and gets caught in the spiral whirlpools 400.

The spiral whirlpools 400 involving ozone crash against the plurality of plates or rod-shaped bodies 22 and are agitated violently. As a result small bubbly ozone turns to micro bubbles and are mixed evenly in the ballast water 100.

The plates or rod-shaped bodies 22 may be so arranged as to traverse the inside of the pipe 3.

In addition, the plates or rod-shaped bodies 22 may be provided with a convex and a concave at their rear end for reducing resistance so that friction resistance may be reduced greatly. This will result in reducing required motor power.

In the present invention, a device for reducing ozone to be mixed in the ballast water 100 is preferably provided.

FIG. 6 shows an example of the device. Numeral 24 is a compressor which is used as an example of an air supply device. The air supplied from the compressor 24 is mixed in the ballast water flowing in the pipe 3 on the downstream side of the location where ozone is fed from the ozonizer 5 through the ozone injection tube 6.

Numeral 25 is a micro-bubble generator. The micro-bubble generator 25 feeds ballast water mixed with air and ozone and generates micro bubbles.

The micro-bubble generating mechanism being observed, focusing only on the air out of the air and ozone fed to the ballast water, $OH^-$ on the interface with bubbles increases and charges the interface negatively. This $OH^-$ is free radical species of active oxygen and has oxidative and microbicidal functions. In this way microorganisms in the ballast water are killed. $OH^-$ is generated in large quantity when the micro-bubbles crush.

That is, in this embodiment, generated micro-bubbles show sterilization effect through interaction between electrifiability of micro-bubbles and crush of micro-bubbles. This allows reduction of the quantity of ozone to be mixed. The quantity of ozone to be mixed can be within the range of 1-20 ppm for the ballast water.

The micro-bubble generator 25 is preferably represented by a static mixer, which does not require power source.

The pressure loss of the micro-bubble generator 25 is preferably within the range of 0.2-0.3 MPa (2-3 kgf/cm$^2$).

FIG. 7 shows another example of devices which reduce the quantity of ozone to be mixed in the ballast water 100.

In FIG. 7, numeral 26 is a jet generating device, which is installed on the pipe 3 between the static mixer 4 and the pressure tank 1.

The jet generating device 26 consists of a water jet nozzle 27 and an impact plate 28, as shown in FIG. 8.

The jet nozzle 27 has preferably a shape of having a squeezing part 271 and an expanding part 272. The ballast water flowing in the pipe 3 with ozone injected therein is once squeezed in the squeezing part 271 and then jetted in the expanding part 272. The jet generating device 26 generates jet in this way. The squeezing part 271 is the origin of the jet.

The impact plate 28 is formed in a smaller shape than the inside diameter of the pipe 3, for example in quadrangle and arranged in the pipe 3 at a position where the water which has passed the expansion part 272 can crash against the impact plate 28. A clearance 281 is formed around or above or below (or on the right or left of) the impact plate 28 to allow water to pass between the inside wall of the pipe 3 and the impact plate 28. Numeral 29 is a reducer.

The distance between the squeezing part 271 and the impact plate 28 is set as appropriate so that eradication can be realized effectively by means of cavitation and impact.

This jet generating device 26 generates jet by means of the water jet nozzle 27 and gives a sharp pressure change to the ballast water flowing in the pipe 3. Thus, this jet generating device 26 ensures that cavitation generates in the ballast water and, therefore, microorganisms such as plankton are destroyed and eradicated.

The ballast water is transferred from the pipe 3 to the water jet nozzle 27 by the pump 2 at the rate of 20-30 m/sec and crashes against the impact plate 28. High pressure generated by the jet, sharp pressure change generated by negative pressure and impactive force and frictional force generated by crash against the impact plate 28 destroy pneumatophores or cell walls of microorganisms such as plankton contained in the ballast water and eradicate them. Required quantity of ozone can be decreased in this way.

The jet generating device 26 is not limited to the embodiment. For example, a plurality of water jet nozzles may be arranged face to face or at an angle to increase the cavitation effect. Besides, the surface shape of the impact plate 28 may be convex or concave to increase the cavitation effect as well.

In the present embodiment, ozone from the ozonizer 5 can be inserted into the ballast water flowing in the pipe 3 before or after it passes through the jet generating device 26. Therefore, the jet generating device 26 may be installed between the pump 3 and the static mixer 4 in the pipe 3.

While the present invention has been described based on the embodiment applicable to the removal of ozone remaining in the ballast water as aforementioned, the present invention is applicable to any water containing residual ozone.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

The invention claimed is:

1. A method of removing ozone remaining in water by separating residual ozone which remains in water after ozone is mixed in the water and kills microorganisms in the water comprising the steps of:
storing water containing the residual ozone in a pressure tank;
supplying the pressure tank with compressed air;
generating coarse bubbles larger than the residual ozone existing in water in the form of micro bubbles in pressurized condition;
making the residual ozone in the form of micro bubbles adhere to the coarse bubbles;
separating the residual ozone from water as the coarse bubbles go up; and
discharging the micro bubbles from the pressure tank.

2. The method of removing remaining ozone in water according to claim 1, wherein the water is ballast water which is to be fed into ballast tanks of ships.

3. The method of removing residual ozone in water according to claim 1, wherein the size of the coarse bubbles is 10-100 times as large as that of the micro bubbles.

4. The method of removing residual ozone in water according to claim 1, wherein compressed air is fed into the pressure tank in discharging the exhaust gas containing micro bubbles and coarse bubbles from the pressure tank.

5. The method of removing residual ozone in water according to claim 1, wherein the pressure tank is provided with a means to prevent shortcutting of the water yet to be rid of the residual ozone.

6. The method of removing residual ozone in water according to claim 1, wherein turbulent flow is generated in the water flowing in a pipe on the downstream side of the position where ozone is injected by use of a static mixer in mixing the ozone in the water.

7. The method of removing residual ozone in water according to claim 1, wherein whirlpools are generated in the water flowing in the pipe on the upstream side of the position where ozone is injected by use of a whirlpool generating screw-propeller in mixing the ozone in the water.

8. The method of removing residual ozone in water according to claim 1, wherein air is mixed together with ozone in mixing the ozone in the water, then micro bubbles are generated.

9. The method of removing residual ozone in water according to claim 1, wherein a jet generating device having a jet nozzle making water jet and an impact plate generating cavitation by making the jet crash against the impact plate are installed in a pipe, and ozone is injected into the water in the pipe before or after the water passes through the jet generating device.

* * * * *